Oct. 17, 1933.  A. HORNER  1,930,939
SOIL COVERING AND METHOD OF USE
Filed July 29, 1931
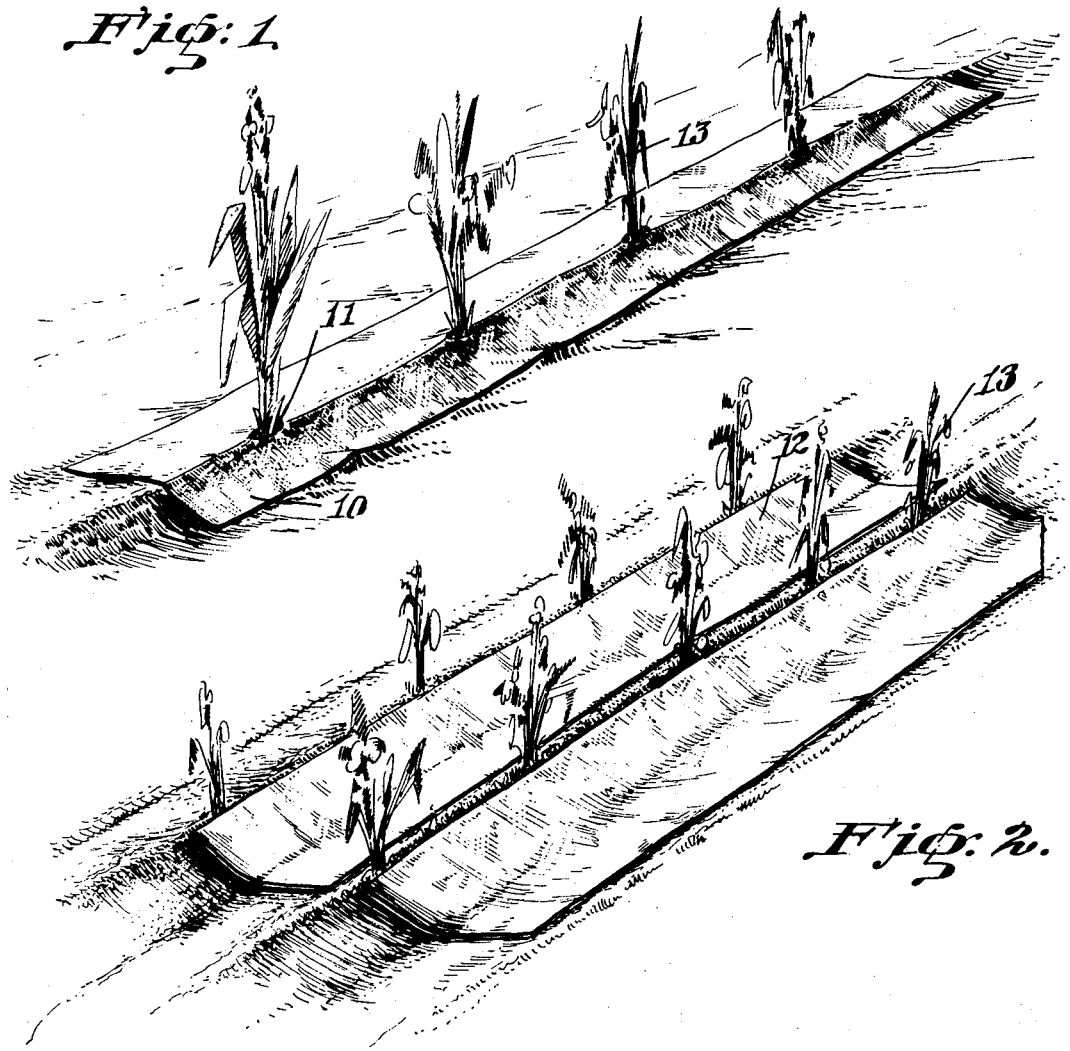
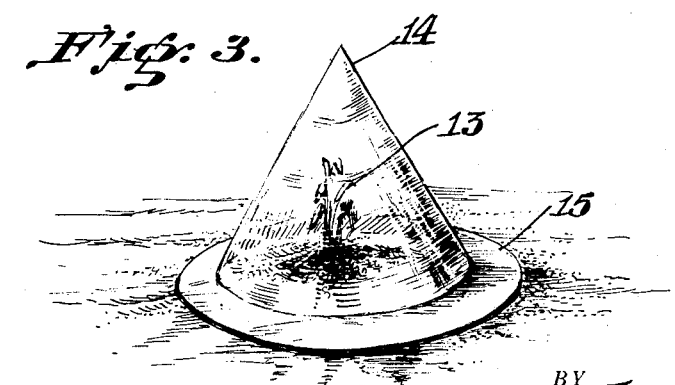
INVENTOR
Albert Horner,
BY Townsend, Loftus & Abbett
ATTORNEYS.

Patented Oct. 17, 1933

1,930,939

UNITED STATES PATENT OFFICE 1,930,939

SOIL COVERING AND METHOD OF USE

Albert Horner, Kapaa Kauai, Territory of Hawaii

Application July 29, 1931. Serial No. 553,750

7 Claims. (Cl. 47—9)

This invention relates to a process of agriculture and means for practicing the same.

It has been found that in the planting and propagation of various forms of vegetable life it is highly desirable to protect the roots of the plants from the ravages of insect life, and at the same time to maintain the root soil at an optimum temperature irrespective of prevailing weather conditions, while incidentally retarding the growth of weeds and the like, in the surrounding soil.

Some of these results have been accomplished to a certain extent by the use of paper mulch, which adds greatly to the growth while plants are in their younger stages, and in some cases when they are more mature, since the temperature of the soil is increased beneath the paper while the roots are protected against storm and the like, but no protection is given against insects and other organisms.

It has been found, on the other hand, that the use of an opaque ground covering has been attended with many objectionable results, as for example, the breeding and germination of a great many injurious insects and micro-organisms, and it is the principal object of the present invention to provide method and means for obtaining all of the known advantages of paper mulch and in most instances to a greater degree by a different and new procedure while eliminating the aforementioned and other disadvantages attained by the use of opaque ground soil coverings, and as well, to obtain additional new advantages.

The present invention contemplates the provision of a translucent soil covering by which the roots of a plant and the soil in which it is embedded may be afforded a protecting and stimulating covering without depriving the plant roots and soil of the benefits obtained by the direct action of the sun's rays passing to the soil through the translucent covering.

The invention is illustrated by way of example in the accompanying drawing, in which:

Figure 1 is a view in perspective showing the improved soil covering through which plants are permitted to grow.

Fig. 2 is a view in perspective showing another form of the invention in which the soil between the rows or plants is covered.

Fig. 3 is a view in perspective showing an individual cap formed of translucent material and covering a plant.

Referring more particularly to the drawing, 10 indicates a sheet of translucent material formed with plant openings 11 at predetermined spaced intervals throughout the length thereof.

In Fig. 2, sheets 12 of translucent material are formed and are laid along and between the rows of plants generally indicated in the drawing at 13.

In the form of the invention shown in Fig. 2, a small unprotected space will occur between the plants along the ridge of the row, while in the form of the invention shown in Fig. 1 that particular space is covered.

In the form of the invention shown in Fig. 3 the translucent material is shaped to provide a conical cap 14, here shown as having a flange 15 upon which loose clods may be laid to hold the cap in position, thus making this device of particular advantage to florists and truck gardeners.

It will of course be understood that while the translucent material has been here shown as having three applications the salient feature of the invention is that of providing a transparent soil covering for plant life, and in the particular form which the covering may assume in order to meet a particular agricultural need.

The translucent material may be a waterproof paper which has been waxed, oiled or in some other suitable manner rendered translucent to the sun's rays. It may also be desirable to utilize nitrocellulose products such as the relatively thin transparent material known to the trade as cellophane, and which material would have substantially the same transparent qualities of glass as used in hothouse frames; or other suitable translucent material.

Attention is directed to the fact that the translucent materials will afford a substantial increase in the temperature of the soil as compared to the use of opaque soil coverings, and that the heating effect derived from the use of translucent or transparent soil coverings is much more desirable than that obtained by the use of opaque soil coverings. In the present instance the sun's rays act directly upon the soil, being retarded to a negligible degree by the translucent material through which they pass, while in the case of opaque soil coverings the heating is by absorption and radiation, as under an iron roof. The action through the translucent covering is greatly increased due to the actual passage of the sun's rays through the covering and the retention of the heated air beneath the covering as would be the case in a glass hothouse.

Experimentation has proven that practically all classes of insects during the heat of the day strenuously object to the direct rays of sunlight, and certain of the insects are actually killed when they are subjected to direct sunlight. It will, therefore, be evident that by the use of a translucent soil covering the propagation of insect life beneath the soil covering will be greatly retarded, if not entirely eliminated. It is also apparent that the high temperatures caused by the direct action of the sun's rays and the obstacle afforded by the soil covering would greatly retard the growth of weeds under the translucent soil covering which would tend to choke out the young plants. In fact, experiment has proven that a temperature can be obtained which is 50° F. in excess of the temperature obtained under opaque soil covering, thereby killing off both undesirable vegetable and animal life.

Another beneficial result obtained by the use of translucent soil covering is that by warming the soil on its surface to a higher temperature, the depth of the soil is also increased in temperature. This causes the roots to seek lower levels and sets the plants more firmly, as contrasted to the fact that under opaque soil coverings the roots frequently seek the surface of the soil, giving the plant a very shallow and unstable root system. This action is also increased due to the darkness obtained by opaque coverings which tends to bring the roots to the surface as compared to the action of the roots in penetrating deep into the soil when subjected to light.

One of the principal advantages of my translucent soil covering is that the soil moisture is withheld from passing away into the air through free evaporation and moisture is, in fact, under certain weather conditions condensed from the air, being observed as drops under the covering and passing into the soil beneath.

It is to be further understood that desirable results may be obtained by the use of a translucent soil covering in various colors, since it has been found that the control of actinic rays as obtained by the filtering action of color screens of various values will have varying effects upon different forms of vegetable life and other organic life under differerent climatic conditions. It will also be evident that the maximum temperatures beneath the soil covering may be established by the use of different colors. In fact, experimentation has proven that by the use of translucent soil coverings of selected colors on clear days, temperatures have been obtained at a depth of two inches below the surface of the soil ranging from 133° F. to as high as 170° F., which are greatly in excess of the normal temperature obtained under similar conditions by the use of opaque soil coverings which showed a temperature of approximately 114°.

Typical results obtained by the use of paper varying in color can be observed from the following test which has been made:

Squares of colored and transparent "cellophane" were placed on the soil and pineapple plants set out through holes cut in the "cellophane" in the manner customarily used in planting through opaque black mulch paper similar to roofing paper.

This was done during the warm days in the summer.

After installation had been in two days, the following temperatures were recorded under the soil coverings and surface soil:

|  | Color | Fairly windy clear day, 1st day | Partial record, clear day, 2d day | Quiet clear day, few clouds, 3d day | Night of 3d day |
|---|---|---|---|---|---|
|  |  | Degrees | Degrees | Degrees | Degrees |
| Single thickness | None | 157 | 182 | 152 | 73 |
| Single thickness | None | 156 |  | 170 | 74 |
| Double thickness | None | 152 | 170 | 161 | 75 |
|  | Tango (a yellow) | 150 |  | *146 | 75 |
|  | Blue | 150 |  | 150 | 73 |
|  | Amber | 149 |  | 144 | 72 |
|  | None | *146 |  | 168 | 70 |
|  | Green | 148 |  | 146 | 74 |
| Double thickness | Red | 140 | 142 | 149 | 72 |
|  | Purple | 140 |  | 142 | 70 |
|  | Pink | 139 |  | 142 | 71 |
| Single thickness | Red | 138 | 140 | 133 | 74 |
|  | Violet | 137 |  | 140 | 75 |
| Opaque mulch | (common) | 123 | *148 | 114 | 72 |

It is to be noted that with the small squares used, rips by the wind sometimes disturbed the results.

The insect population varied inversely with the temperature, being practically absent with the clear uncolored materials.

Under the single red, violet and common opaque black mulch, they were greater than on the open uncovered soil, consisting of ants (Pheidole megacephalus), cockroaches, symphilids, etc.

Recordings marked * seem to be irregular and probably have some environmental factor disturbing the results as, for example, a temporary pool of rain water on the paper (not observed) or soil lumps raising the paper overly high.

It will thus be seen that by the use of translucent soil coverings numerous desirable advantages may be maintained in the propagation of plants; as for example, added heat for the soil, greater penetration of the plant roots, and a greater penetration of heat which results are accompanied by the creation of a condition under which the growth and reproduction of insect and micro-organisms will be materially retarded, if not eliminated, and the same action will take place upon weeds and other undersirable plant life growing under the soil covering. At the same time the rate of growth of the crop protected by the soil covering is materially increased.

While I have shown the preferred form of my process of agriculture and means for carrying out the same, it will be understood that various changes might be made in this invention by those skilled in the art without departing from the spirit of the same.

Having thus described my invention, what I claim and desire to secure by Letters Patent is:

1. A method of increasing the rate of plant growth which consists of setting out the plants through a translucent colored soil covering laid directly on the soil.

2. A method of plant propagation which consists in planting the roots of a plant in soil and thereafter covering said soil by laying thereon a flexible translucent sheet of material which has a color value whereby the covering will act as a light filter.

3. A method of plant propagation which consists in planting the roots of a plant in soil and covering the soil planting by laying thereon a translucent sheet of non-vitreous material, which has a color value by which the translucent sheet of material becomes a light filter.

4. A method of controlling soil temperature, soil insects and organisms, the growth of weeds, and the loss of moisture, consisting in laying on the soil a translucent soil covering consisting of a thin sheet of non-vitreous material permitting the penetration of light rays into the soil.

5. A method of controlling soil temperature, soil insects and organisms, growth of weeds and loss of moisture, which consists in laying on the soil of a plant bed a translucent soil covering of thin flexible sheet material substantially covering the entire area of the soil of the bed.

6. The herein described method of controlling soil temperature, growth of weeds and loss of moisture of plant beds and of increasing the rate of plant growth which consists in laying on the soil of the plant bed throughout substantially the entire area of the same, a colored translucent soil covering of sheet material.

7. The herein described method of controlling soil temperature, soil insects and organisms, growth of weeds and loss of moisture of plant beds and of increasing the rate of plant growth which consists in laying on the soil of the plant bed throughout substantially the entire area of the same, a translucent soil covering of sheet material.

ALBERT HORNER.